United States Patent [19]
Nakamura et al.
[11] 3,805,173
[45] Apr. 16, 1974

[54] BAND PASS FILTER AND PHASE CONTROL CIRCUIT ELIMINATING PHASE DIFFERENCES BETWEEN INPUT AND OUTPUT

[75] Inventors: Hiroshi Nakamura, Sagamihara; Hiroaki Oyama, Tokyo; Tadayoshi Kato, Kawasaki; Tokihiro Miyo, Yokohama, all of Japan

[73] Assignee: Fujitsu Limited, Kawasaki, Japan

[22] Filed: June 12, 1973

[21] Appl. No.: 369,254

[30] Foreign Application Priority Data

June 14, 1972 Japan .............................. 47-59153

[52] U.S. Cl. .............................. 328/155, 328/167
[51] Int. Cl. .............................. H03b 3/06
[58] Field of Search .............................. 328/167, 155

[56] References Cited

UNITED STATES PATENTS 3,375,451 3/1968 Borelli .............................. 328/167
3,458,823 7/1969 Nordahl .............................. 328/155
3,593,150 7/1971 Michishita .............................. 328/155 X

*Primary Examiner*—John S. Heyman
*Attorney, Agent, or Firm*—Daniel Jay Tick

[57] ABSTRACT

A band pass filter circuit for a band pass filter comprises a phase detector connected to the band pass filter for determining the difference in phase between input and output signals of the band pass filter. A voltage controlled oscillator coupled to the phase detector has a frequency of oscillation controlled by detection output signals of the phase detector. A first frequency converter is connected to the input of the band pass filter. Input signals are supplied to the first frequency converter. A second frequency converter is connected to the output of the band pass filter and to the voltage controlled oscillator and provides an output signal. A phase control circuit connected between the voltage controlled oscillator and the first frequency converter varies the phase of output signals of the voltage controlled oscillator and controls the frequency conversion of the first frequency converter in accordance therewith.

5 Claims, 8 Drawing Figures

BAND PASS FILTER AND PHASE CONTROL CIRCUIT ELIMINATING PHASE DIFFERENCES BETWEEN INPUT AND OUTPUT

BACKGROUND OF THE INVENTION

The present invention relates to a band pass filter circuit. More particularly, the invention relates to a band pass filter circuit which reduces phase differences between the input and the output to zero.

Normally, a band pass filter circuit comprises a band pass filter, designed to pass only the signal in the required band, and a limiter circuit. In a band pass filter circuit of this type, if the input signal frequency varies by $\Delta f$ from the center frequency $fo$ of the band pass filter, there is a corresponding change $\Delta\theta$ in the output phase of the band pass filter due to the phase characteristic of the filter. Furthermore, there is a possibility that the center frequency $fo$ of the band pass filter may vary due to temperature changes or aging, although the input signal frequency is constant. This, therefore, also results in an output phase difference. The output phase differences are likely to have adverse effects when used in circuits which require highly accurate phase synchronization, such as carrier regeneration circuits of multiphase PCM mode.

The principal object of the invention is to provide a band pass filter circuit which completely eliminates, by reducing to zero, phase differences between the input and output.

An object of the invention is to provide a band pass filter circuit which substantially reduces and reduces to zero phase difference between the input and output caused by factors outside the filter circuit.

Another object of the invention is to provide a band pass filter circuit of simple structure which reduces to zero phase differences between the output and the input with efficiency, effectiveness and reliability.

BRIEF SUMMARY OF THE INVENTION

The band pass filter circuit of the invention solves the problem of phase differences between the input and the output by converting the input frequency via a first frequency converter in accordance with the output of a voltage controlled oscillator. After the input frequency is converted, it is passed through the band pass filter and is then converted back to the input frequency by a second frequency converter. The input and output phases of the band pass filter are detected by a phase detector, and the detected output of the phase detector, corresponding to the difference in phase between the input and output, is supplied to the voltage controlled oscillator via a band pass filter. A feedback loop controls the frequency of oscillation of the voltage controlled oscillator supplied to the frequency converters. If there is a phase difference between the input and output of the band pass filter, the oscillation frequency of the voltage controlled oscillator is controlled to maintain such phase difference constant.

A circuit of the aforedescribed type reduces the usual phase error, but does not reduce such error to zero, because the gain of the feedback loop is finite. Constant phase errors caused by factors outside the feedback loop cannot be reduced to zero.

In accordance with the present invention, the band pass filter circuit comprises a phase detector for determining the phase difference between the input and the output of the band pass filter. A voltage control oscillator is controlled by the detected output of the phase detector. A first frequency converter is connected to the input of the band pass filter and a second frequency converter is connected to the output of the band pass filter. The output of the voltage controlled oscillator is supplied to the first and second frequency converters. A phase control circuit is connected between an output of the voltage controlled oscillator and an input of the first frequency converter.

In accordance with the invention, a band pass filter circuit for a band pass filter having an input and an output comprises a phase detector having inputs connected to the input and output of the band pass filter and an output for determining the difference in phase between input and output signals of the band pass filter. A voltage controlled oscillator having an input coupled to the output of the phase detector and outputs has a frequency of oscillation controlled by detection output signals of the phase detector. A first frequency converter having inputs and an output is connected to the input of the band pass filter. An input supplies input signals to an input of the first frequency converter. A second frequency converter having an input connected to the output of the band pass filter, an input connected to an output of the voltage controlled oscillator and an ouptut, provides an output signal. A phase control circuit is connected between an output of the voltage controlled oscillator and an input of the first frequency converter and varies the phase of output signals of the voltage controlled oscillator and controls the frequency conversion of the first frequency converter in accordance therewith.

The band pass filter circuit further comprises a low pass filter connected between the output of the phase detector and the input of the voltage controlled oscillator. The phase control circuit comprises a delay circuit, in one embodiment and comprises a filter circuit in another embodiment.

The first frequency converter multiplies input and output signals of the voltage controlled oscillator and produces an output signal corresponding to the difference therebetween and the second frequency converter multiplies input signals supplied thereto and output signals of the voltage controlled oscillator and produces an output signal corresponding to the sum thereof.

BRIEF DESCRIPTION OF THE INVENTION

In order that the invention may be readily carried into effect, it will now be described with reference to the accompanying drawings, wherein.

Figure 1:
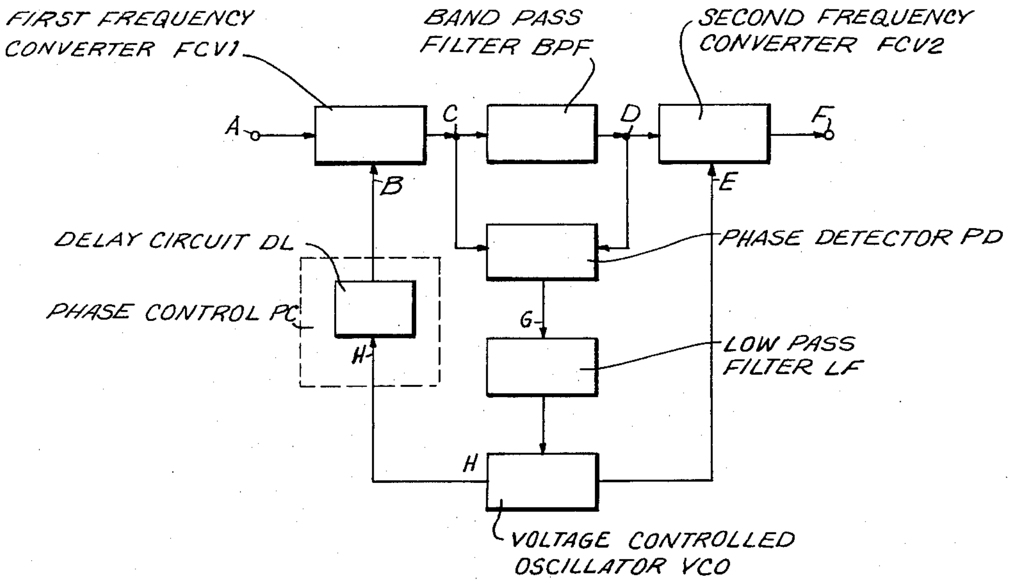
FIG. 1 is a block diagram of an embodiment of the band pass filter circuit of the invention.
Figure 4:
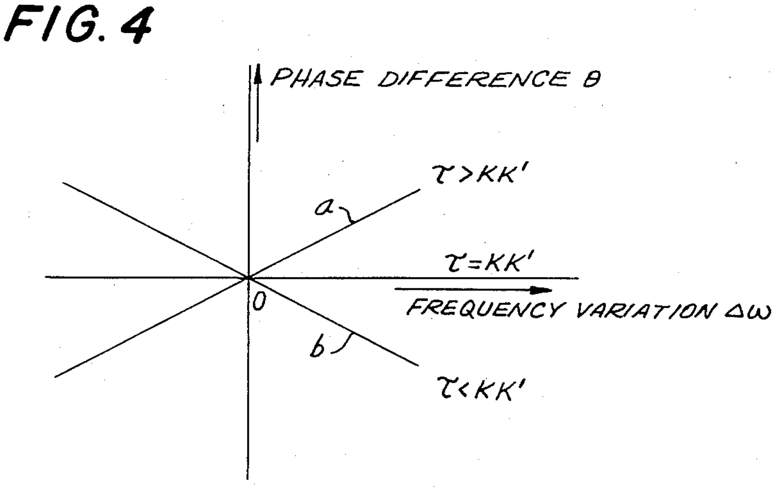
Figure 3A:
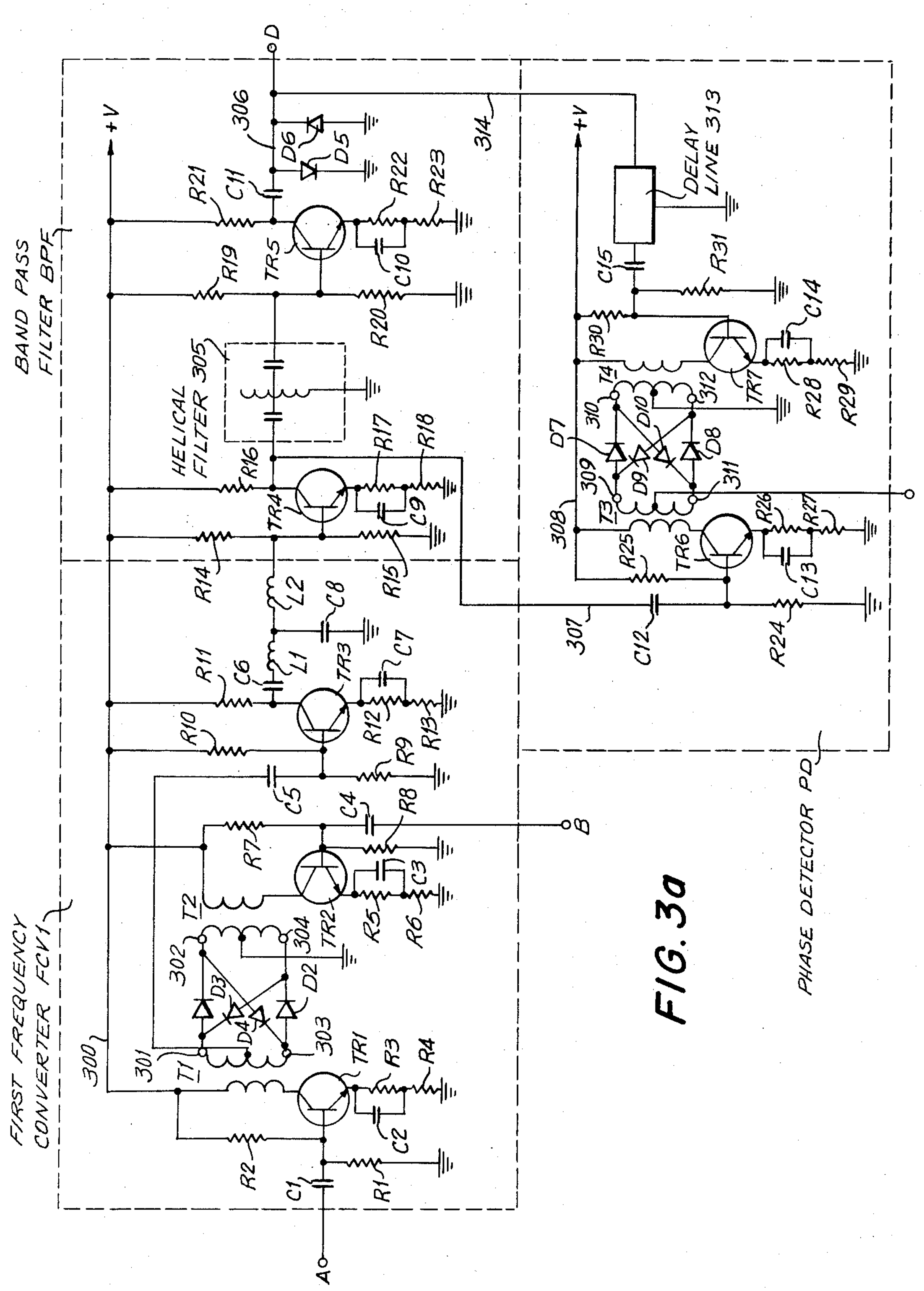
Figure 3B:
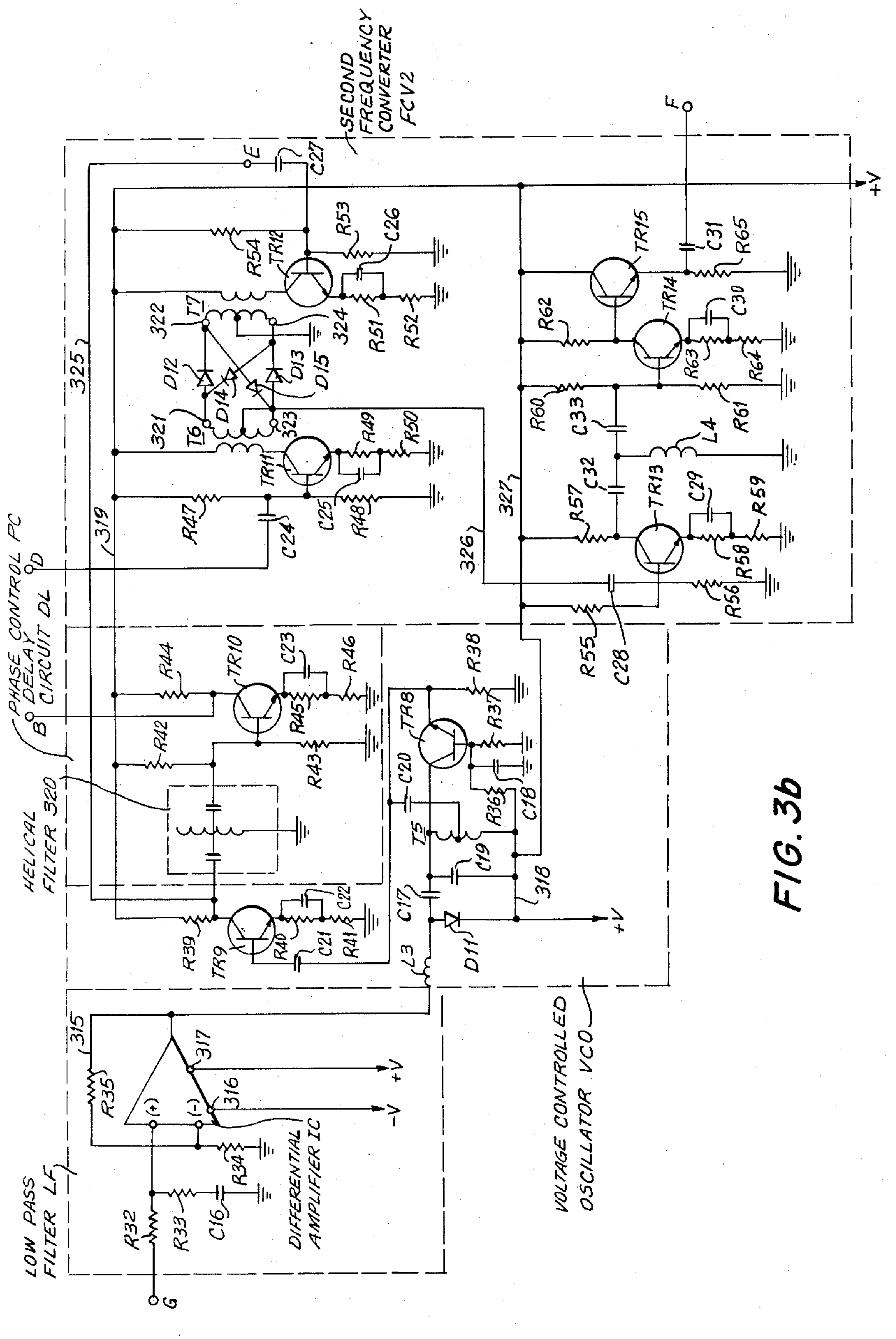
Figure 5:
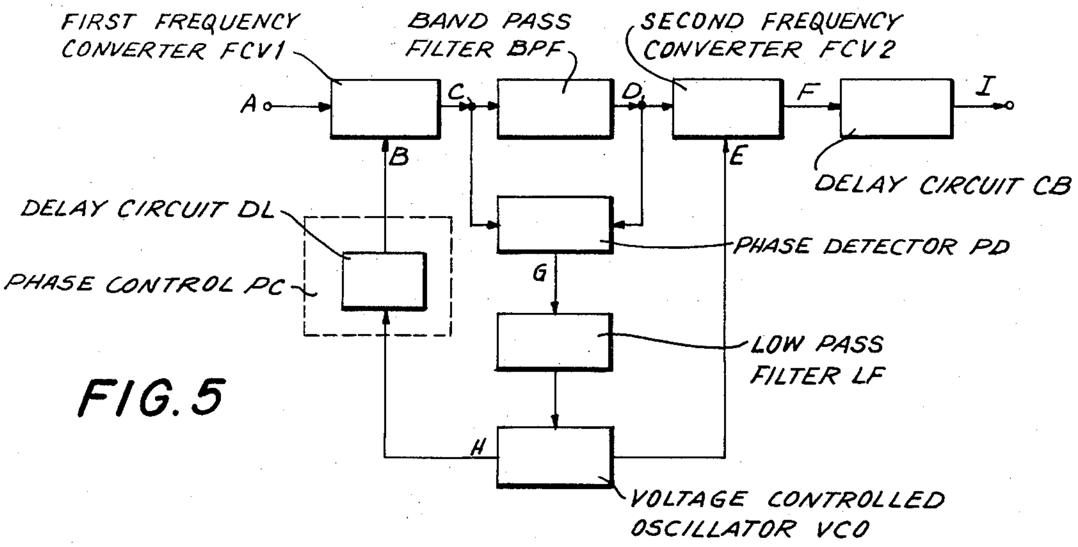
Figure 6:
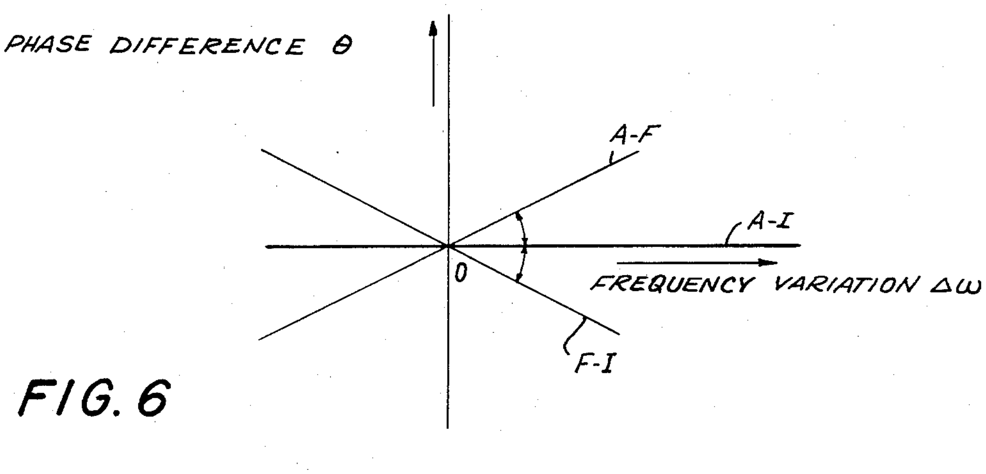
Figure 7:
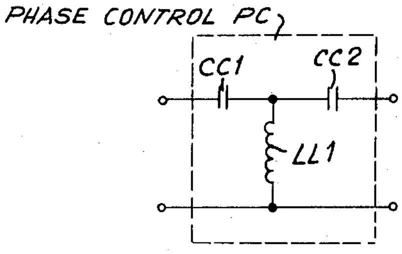

FIGS. 3*a* and 3*b* are circuit diagrams of the embodiment of FIG. 1 of the band pass filter circuit of the invention;

FIG. 4 is a graphical presentation of frequency variation versus phase difference, with delay times of the delay circuit of the band pass filter circuit as parameters;

FIG. 5 is a block diagram of another embodiment of the band pass filter circuit of the invention, involving factors outside the feedback loop;

FIG. 6 is a graphical presentation of frequency variation versus phase difference, when factors outside the feedback loop are involved; and FIG. 7 is a circuit diagram of a filter which may be utilized as the phase control of the band pass filter circuit of the invention.

In the FIGS., the same components are identified by the same reference numerals.

DETAILED DESCRIPTION OF THE INVENTION

As shown in FIG. 1, the band pass filter circuit includes a first frequency converter FCV1 which converts the input signal frequency. The converted input frequency is passed through a band pass filter BPF to the input of a voltage controlled oscillator VCO. The output of the voltage controlled oscillator VCO is supplied to the first frequency converter FCV1 and controls its frequency conversion operation. A second frequency converter FCV2 converts the frequency back to the input signal frequency after it passes through the band pass filter BPF. The output F of the second frequency converter FCV2 is the output of the band pass filter circuit. The phases of the input and output signals of the band pass filter BPF are detected by a phase detector PD. The difference in phase between the input and output signals, detected by the phase detector PD, is supplied to the voltage controlled oscillator VCO via a low pass filter LF.

The frequency of oscillation of the voltage controlled oscillator VCO is supplied to the first and second frequency converters FCV1 and FCV2. Thus, the frequency of oscillation of the voltage controlled oscillator VCO controls the first and second frequency converters FCV1 and FCV2. If there is a difference between the phases of the input and output signals, the oscillation frequency of the voltage controlled oscillator VCO is controlled so that the phase difference is maintained constant. However, since the gain of the feedback loop of the band pass filter is not infinite, a constant phase error necessarily occurs. This may be said to be the shortcoming of a band pass filter of the aforedescribed type.

In order to reduce the constant phase error to zero, in the band pass filter circuit of the invention, the output oscillations of the voltage controlled oscillator VCO are applied to the first frequency converter FCV1 via a phase control PC, which comprises a delay circuit DL. The phase control PC may comprise a filter such as, for example, a T type filter CC1, CC2, LL1, as shown in FIG. 7.

The principles of operation of the band pass filter circuit of the invention are as follows. It is assumed, in FIG. 1, that the input carrier frequency is $\omega o$, the center frequency of the band pass filter BPF is $\omega f$ and the center frequency of the voltage controlled oscillator VCO is $\omega v$. The following equation is then obtained.

$$\omega f = \omega o - \omega v \qquad (1)$$

If the input carrier frequency varies from $\omega o$ by $\Delta\omega$, it becomes $\omega o + \Delta\omega$.

The frequency of oscillation of the voltage controlled oscillator VCO varies by $\Delta\omega'$ and becomes $\omega v + \Delta\,\omega'$, under the control of the phase detector PD, in order to maintain the input frequency of the band pass filter BPF constant. As a result, the input signal frequency of the band pass filter BPF is as follows:

$$\omega o + \Delta\,\omega - (\omega v + \Delta\omega') = \omega f + (\Delta\,\omega - \Delta\omega') \qquad (2)$$

However, since the gain of the feedback loop is $$G = (|\Delta\,\omega|) / (|\Delta\,\omega'|) > 1$$

the following is established.

$$|\Delta\,\omega| > |\Delta\,\omega'|$$

Figure 2:
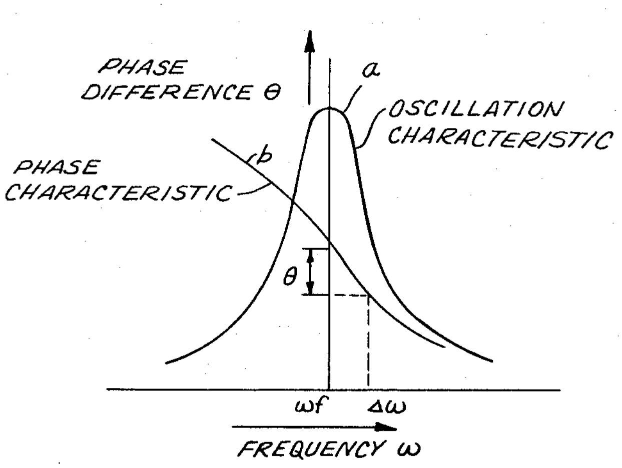
FIG. 2 is a graphical presentation of the oscillation and phase characteristics of the band pass filter.

The band pass filter BPF has an oscillation characteristic $a$ and a phase characteristic $b$, shown in FIG. 2. In FIG. 2, the abscissa represents the frequency $\omega$ and the ordinate represents the phase difference $\theta$. If the frequency of the input signal to the band pass filter BPF differs from the center frequency $\omega f$ of the band pass filter by $\Delta\omega$, the output signal of the band pass filter BPF is $\theta$. The phase difference between the input and output signals of the band pass filter BPF is detected by the phase detector PD. The phase detector PD controls the frequency of oscillation of the voltage controlled oscillator VCO.

Since the quantity ($\Delta\omega - \Delta\omega'$) of Equation (2) is proportional to the variation $\Delta\omega$ of the frequency of oscillation of the voltage controlled oscillator VCO, $$\Delta\omega - \Delta\omega' = K\,\Delta\,\omega' = a\,\Delta\omega \qquad (3)$$

In Equation (3), K and $a$ are proportionality constants. They are positive and greater than zero.

As is clear from the phase characteristic $b$ in FIG. 2, the phase difference $\theta$ and the quantity ($\Delta\,\omega - \Delta\,\omega'$) are proportional in a range close to the center frequency $\omega f$ of the band pass filter BPF and may be expressed as follows.

$$\theta = -K'\,(\Delta\,\omega - \Delta\,\omega') = -K\,K\,\Delta\omega' \qquad (4)$$

wherein $K'$ is a proportionality constant and is greater than zero.

If it is assumed that the delay time $\tau$ of the delay circuit DL is $$\tau = K\,K' \qquad (5)$$

the constant phase difference $\theta$ may be reduced to zero.

If it is assumed that the initial phase difference in the input signal in FIG. 1 is zero, the signal at points A to F may be expressed as follows. The signal at point A, or the input signal to the band pass filter circuit is $$\text{(A)}\ \cos(\omega o + \Delta\,\omega)t \qquad (6)$$

The signal at point B, or the signal provided by passing the output of the voltage controlled oscillator VCO through the delay line DL, is $$\text{(B)}\ \cos[(\omega v + \Delta\,\omega')t - \tau\,\Delta\omega'] \qquad (7)$$

The signal at point C, or the output signal of the first frequency converter FCV1 is obtained via a low pass filter which retrieves the low frequency component from the product of multiplication of the signals at points A and B. The low frequency component is retrieved, rather than the high frequency component, to realize a beat down in order to operate the band pass filter BPF at low frequency. That is, $$\cos(\omega o + \Delta \omega)t \cdot \cos[(\omega v + \Delta\omega')t - \tau \Delta\omega']$$
$$= 1/2 \cos[(\omega o + \omega v + \Delta\omega + \Delta\omega')t - \tau \Delta\omega']t +$$
$$\cos[(\omega o - \omega v + \Delta\omega - \Delta\omega')t + \tau \Delta\omega']$$

The signal at point C therefore represents the difference components, or low frequency components. The signal at point C is $$\text{(C)} \cos[(\omega o - \omega v + \Delta\omega - \Delta\omega')t + \tau \Delta \omega'] = \cos[(\omega f + K \Delta\omega')t + \tau \Delta\omega'] \quad (8)$$

The signal at point D, or the output of the band pass filter BPF is as follows, since the constant phase error of the band pass filter is $\theta$.

$$\text{(D)} \cos[(\omega f + K \Delta\omega')t + \theta + \tau \Delta\omega'] \quad (9)$$

The signal at point E, or the output of the voltage controlled oscillator VCO, is $$\text{(E)} \cos(\omega v + \Delta \omega')t \quad (10)$$

The signal at point F, of the output signal of the second frequency converter FCV2, is obtained by multiplying the signals at points D and E and retrieving the high frequency component via a high pass filter. The signal at point F is a sum component, or high frequency component, due to the following relation.

$$\text{(F)} \cos[(\omega f + \omega v + K \Delta\omega' + \Delta\omega')t + \theta + \tau \Delta \omega']$$
$$= \cos(\omega o + \Delta\omega)t + \theta + \tau \Delta\omega'$$
$$= \cos(\omega o + \Delta\omega)t + \theta + \tau a/K \Delta \omega \quad (11)$$

The quantities $\theta$ and $\tau \Delta\omega'$, as derived from Equations (4) and (5), are $$\theta = -KK' \Delta\omega' = -\tau \Delta\omega'$$

Therefore, the signal at point F, or the signal at the output of the band pass filter circuit, becomes $$\cos(\omega o + \Delta \omega)t \quad (12)$$

Equation (12) is thus the same as Equation (6) which indicates the input waveform at point A. As a result, the constant phase error may be reduced to zero by adjusting the delay time $\tau$ of the delay circuit DL as in Equation (5).

FIGS. 3*a* and 3*b* illustrate the circuitry of the band pass filter circuit of the invention. In FIG. 3*a*, the first frequency converter FCV1 comprises a transistor TR1 having a base electrode connected to the input point A via a capacitor C1. The base electrode of the transistor TR1 is connected to a point at ground potential via a resistor R1. The collector electrode of the transistor TR1 is connected to a source of positive voltage +V via the primary winding of a transformer T1 and a lead 300. The base1 electrode is connected to the lead 300 via a resistor R2. The emitter electrode of the transistor TR1 is connected to a point at ground potential via a pair of series-connected resistors R3 and R4. A capacitor C2 is connected in shunt with the resistor R3.

The secondary winding of the transformer T1 is connected to the primary winding of a transformer T2 via diodes D1, D2, D3 and D4. One end 301 of the secondary winding of the transformer T1 is connected to one end 302 of the primary winding of the transformer T2 via the diode D1. The other end 303 of the secondary winding of the transformer T1 is connected to the other end 304 of the primary winding of the transformer T2 via the diode D2. The end 301 is also connected to the end 304 via the diode D3, connected in the opposite direction of conductivity from the diodes D1 and D2. The end 302 is also connected to the end 303 via the diode D4, connected in the opposite direction of conductivity from the diodes D1 and D2.

A transistor TR2 has a collector electrode connected to the lead 300 via the secondary winding of the transformer T2. The emitter electrode of the transistor TR2 is connected to a point at ground potential via a pair of series-connected resistors R5 and R6. A capacitor C3 is connected in shunt with the resistor R5. The base electrode of the transistor TR2 is connected to the lead 300 via a resistor R7 and is connected to a point at ground potential via a resistor R8. The base electrode of the transistor TR2 is also coupled to the point B via a capacitor C4.

The primary winding of the transformer T2 has a midpoint connected to a point at ground potential. The secondary winding of the transformer T1 has a midpoint coupled to the base electrode of a transistor TR3 via a capacitor C5. The base electrode of the transistor TR3 is connected to a point at ground potential via a resistor R9 and is also connected to the lead 300 via a resistor R10. The collector electrode of the transistor TR3 is connected to the lead 300 via a resistor R11. A series-connected capacitor C6, an inductor L1 and an inductor L2 are connected to the collector electrode of the transistor TR3. The emitter electrode of the transistor TR3 is connected to a point at ground potential via a pair of series-connected resistors R12 and R13. A capacitor C7 is connected in shunt with the resistor R12. A capacitor C8 is connected between a common point in the connection of the inductors L1 and L2 and a point at ground potential.

The band pass filter BPF comprises a transistor TR4 having a base electrode connected to the inductor L2, connected to the lead 300 via a resistor R14 and connected to a point at ground potential via a resistor R15. The collector electrode of the transistor TR4 is connected to the lead 300 via a resistor R16. The emitter electrode of the transistor TR4 is connected to a point at ground potential via a pair of series-connected resistors R17 and R18. A capacitor C9 is connected in shunt with the resistor R17.

The collector electrode of the transistor TR4 is connected to the base electrode of a transistor TR5 via a helical filter 305. The base electrode of the transistor TR5 is connected to the lead 300 via a resistor R19 and is connected to a point at ground potential via a resistor R20. The collector electrode of the transistor TR5 is connected to the lead 300 via a resistor R21. The emitter electrode of the transistor TR5 is connected to a point at ground potential via a pair of series-connected resistors R22 and R23. A capacitor C10 is connected in shunt with the resistor R22. The point D is coupled to the collector electrode of the transistor TR5 via a capacitor C11 and a lead 306. A diode D5 is connected between the lead 306 and a point at ground potential in one direction of conductivity. A diode D6 is connected between the lead 306 and a point at ground potential in the opposite direction of conductivity.

The phase detector PD comprises a transistor TR6 having a base electrode coupled to the collector electrode of the transistor TR4 via a capacitor C12 and a lead 307. The base electrode of the transistor TR6 is connected to a point at ground potential via a resistor R24. The base electrode of the transistor TR6 is connected to the source of positive voltage +V via a resistor R25 and a lead 308. The emitter electrode of the transistor TR6 is connected to a point at ground potential via a pair of series-connected resistors R26 and R27. A capacitor C13 is connected in shunt with the resistor R26.

The collector electrode of the transistor TR6 is connected to the lead 308 via the primary winding of a transformer T3. The primary winding of the transformer T3 has a midpoint connected to the point G. The secondary winding of the transformer T3 is connected to the primary winding of a transformer T4 via diodes D7, D8, D9 and D10. One end 309 of the secondary winding of the transformer T3 is connected to one end 310 of the primary winding of the transformer T4 via the diode D7. The other end 311 of the secondary winding of the transformer T3 is connected to the other end 312 of the primary winding of the transformer T4 via the diode D8. The end 309 is also connected to the end 312 via the diode D9, connected in the opposite direction of conductivity from the diodes D7 and D8. The end 310 is also connected to the end 311 via the diode D10, connected in the opposite direction of conductivity from the diodes D7 and D8. The primary winding of the transformer T4 has a midpoint connected to a point at ground potential.

A transistor TR7 has a collector electrode connected to the lead 308 via the secondary winding of the transformer T4. The emitter electrode of the transformer TR7 is connected to a point at ground potential via a pair of series-connected resistors R28 and R29. A capacitor C14 is connected in shunt with the resistor R28. The base electrode of the transistor TR7 is connected to the lead 308 via a resistor R30 and is connected to a point at ground potential via a resistor R31. The base electrode of the transistor TR7 is coupled to the point D via a capacitor C15, a delay line 313 and a lead 314.

As shown in FIG. 3*b*, the low pass filter LF comprises a differential amplifier IC having a positive input connected to the point G, and thus the midpoint of the secondary winding of the transformer T3 of the phase detector PD of FIG. 3*a*, via a resistor R32 and coupled to a point at ground potential via a resistor R33 and a capacitor C16 connected in series. The differential amplifier IC has a negative input connected to a point at ground potential via a resistor R34 and connected to the output of the differential amplifier via a feedback loop 315 and a feedback resistor R35 connected in the loop. The differential amplifier IC has a terminal 316 connected to a source of negative voltage −V and a terminal 317 connected to a source of positive voltage +V.

The voltage controlled oscillator VCO comprises a transistor TR8 having a collector electrode coupled to the output of the differential amplifier IC via an inductor L3 and a capacitor C17. A diode D11 is connected between a common point in the connection between the inductor L3 and the capacitor C17 and a source of positive voltage +V. The base electrode of the transistor TR8 is connected to the source of positive voltage +V via a resistor R36 and a lead 318 and is connected to a point at ground potential via a resistor R37 and a capacitor C18 connected in parallel with the resistor R37.

A capacitor C19 is connected between the collector electrode of the transistor TR8 and the lead 318. An autotransformer T5 is connected in parallel with the capacitor C19, between the collector electrode of the transistor TR8 and the lead 318. The autotransformer T5 has a midpoint coupled to the emitter electrode of the transistor TR8 via a capacitor C20 and to the base electrode of a transistor TR9 via the capacitor C20 and a capacitor C21. The emitter electrode of the transistor TR8 is connected to a point at ground potential via a resistor R38.

The collector electrode of the transistor TR9 is connected to a source of positive voltage +V via a resistor R39 and a lead 319. The emitter electrode of the transistor TR9 is connected to a point at ground potential via a pair of series-connected resistors R40 and R41. A capacitor C22 is connected in shunt with the resistor R40.

The phase control PC comprises a delay circuit DL, which comprises a transistor TR10 having a base electrode connected to the collector electrode of the transistor TR9 via a helical filter 320, which functions as a delay component. The base electrode of the transistor TR10 is connected to the lead 319 via a resistor R42 and to a point at ground potential via a resistor R43. The input of the helical filter 320 is connected to the point H. The collector electrode of the transistor TR10 is connected to the lead 319 via a resistor R44 and is also directly connected to the point B. The emitter electrode of the transistor TR10 is connected to a point at ground potential via a pair of resistors R45 and R46. A capacitor C23 is connected in shunt with the resistor R45.

The second frequency converter FCV2 comprises a transistor TR11 having a base electrode connected to the lead 319 via a resistor R47 and coupled to the point D via a capacitor C24. The base electrode of the transistor TR11 is also connected to a point at ground potential via a resistor R48. The emitter electrode of the transistor TR11 is connected to a point at ground potential via a pair of resistors R49 and R50. A capacitor C25 is connected in shunt with the resistor R50.

The collector electrode of the transistor TR11 is connected to the lead 319 via the primary winding of a transformer T6. The secondary winding of the transformer T6 is connected to the primary winding of a transformer T7 via diodes D12, D13, D14 and D15. One end 321 of the secondary winding of the transformer T6 is connected to one end 322 of the primary winding of the transformer T7 via the diode D12. The other end 323 of the secondary winding of the transformer T6 is connected to the other end 324 of the primary winding of the transformer T7 via the diode D13. The end 321 is also connected to the end 324 via the diode D14, connected in the opposite direction of conductivity from the diodes D12 and D13. The end 322 is also connected to the end 323 via the diode D15, connected in the opposite direction of conductivity from the diodes D12 and D13. The primary winding of the transformer T7 has a midpoint connected to a point at ground potential.

A transistor TR12 has a collector electrode connected to the lead 319 via the secondary winding of the transformer T7. The emitter electrode of the transistor TR12 is connected to a point at ground potential via a pair of resistors R51 and R52. A capacitor C26 is connected in shunt with the resistor R51. The base electrode of the transistor TR12 is connected to a point at ground potential via a resistor R53 and to the lead 319 via a resistor R54. The point E is coupled to the base electrode of the transistor TR12 via a capacitor C27 and a lead 325 connected to the collector electrode of the transistor TR9 of the voltage controlled oscillator VCO.

The secondary winding of the transformer T6 has a midpoint. A transistor TR13 has a base electrode coupled to the midpoint of the secondary winding of the transformer T6 via a capacitor C28 and a lead 326 and connected to the lead 319 via a resistor R55 and a lead 327. The lead 327 is connected between the lead 319 and the source of positive voltage +V to which the diode D11 is connected. The base electrode of the transistor TR13 is also connected to a point at ground potential via a resistor R56.

The collector electrode of the transistor TR13 is connected to the lead 327 via a resistor R57. The emitter electrode of the transistor TR13 is connected to a point at ground potential via a pair of resistors R58 and R59. A capacitor C29 is connected in shunt with the resistor R58.

A transistor TR14 has a base electrode connected to the lead 327 via a resistor R60 and to a point at ground potential via a resistor R61. The collector electrode of the transistor TR14 is connected to the lead 327 via a resistor R62 and to the base electrode of a transistor TR15. The emitter electrode of the transistor TR14 is connected to a point at ground potential via a pair of resistors R63 and R64. A capacitor C30 is connected in shunt with the resistor R63. The collector electrode of the transistor TR15 is directly connected to the lead 327. The emitter electrode of the transistor TR15 is connected to a point at ground potential via a resistor R65 and is coupled to the point F via a capacitor C31.

The collector electrode of the transistor TR13 is coupled to the base electrode of the transistor TR14 via a pair of capacitors C32 and C33. An inductor L4 is connected between a common point in the connection of the capacitors C32 and C33 and a point at ground potential.

The transistors TR1, TR2 and TR3 of the first frequency converter FCV1 of FIG. 3*a* are connected with the capacitors C1 to C7 and the resistors R1 to R13 as common emitter amplifiers. The transformers T1 and T2 and the diodes D1 to D4 of the first frequency converter FCV1 of FIG. 3*a* are connected as a double balanced mixer. The inductors L1 and L2 and the capacitor C8 of the first frequency converter FCV1 are connected as a low pass filter.

The signal from the point A at the input terminal is amplified by the transistor amplifier TR1 and is mixed by the double balanced mixer with the output signal of the voltage controlled oscillator VCO, which signal is supplied to the first frequency converter FCV1 via the delay line DL. The signal from the delay line DL is supplied from the point B via the transistor amplifier TR2. The signal is subjected to beat down in the double balanced mixer and is passed through the transistor amplifier TR3. Unnecessary spurious noise is filtered by the low pass filter. The output signal of the low pass filter is fed to the band pass filter BPF.

The transistors TR4 and TR5, the capacitors C9 to C11 and the resistors R14 to R23 of the band pass filter BPF function as two sets of common emitter type amplifiers. The diodes D5 and D6 function as an amplitude limiter. The helical filter 305 functions as the band pass filter. The helical filter 305 has a center frequency *fo–fi*-fVCO, wherein fi is the input frequency and fVCO is the frequency of oscillation of the voltage controlled oscillator VCO. The helical filter 305 is a distributed constant type filter, assuring realization of a high Q.

The signal from the first frequency converter FCV1 is amplified by the transistor TR4 of the band pass filter BPF and is applied to the band pass helical filter 305. After the noise is eliminated in the band pass helical filter 305, the signal is supplied to the amplitude limiter D5, D6. The output of the amplitude limiter D5, D6 is divided into two and is fed to the second frequency converter FCV2 at the point D and the phase detector PD.

The transistors TR6 and TR7, the capacitors C12 to C15 and the resistors R24 to R31 of the phase detector PD function as two sets of common emitter type amplifiers. The transformers T3 and T4 and the diodes D7 to D10 function as a double balanced mixer type phase detector. The delay line 313 provides a phase shift of $\pi/2$ radian for the center frequency fo. The phase detector PD provides a phase comparison between the helical filter input signal, which is obtained via the transistor amplifier TR4 of the band pass filter BPF, of the band pass filter BPF and the output signal of the amplitude limiter D5, D6. The signals are amplified by the transistor amplifier TR6 and the transistor amplifier TR7, respectively, and are then supplied to the double balanced type phase detector D7 to D10, T3, T4. The delay line 313 is provided for adjusting phase bias in the double balanced type phase detector. The output of the double balanced type phase detector of the phase detector PD is fed to the low pass filter LF of FIG. 3*b* via the point G.

The resistors R32 and R33 and the capacitor C16 function as a low pass filter in the low pass filter LF. The differential amplifier IC, the capacitor C16 and the resistors R34 and R35 function as a DC amplifier. The output signal from the phase detector PD of FIG. 3*a* passes through the low pass filter LF via the point G, is amplified by the DC amplifier, which includes the differential amplifier IC, and is supplied to the voltage controlled oscillator VCO.

The transistor TR8, the capacitors C17 to C19, the resistors R36 to R38, the inductor L3 and the variable capacitance diode D11 of the voltage controlled oscillator VCO function as a Hartley type voltage controlled oscillator. The transistor TR9, the capacitors C20 and C21 and the resistors R39 to R41 function as a common emitter type amplifier. The output signal of the low pass filter LF is supplied to the voltage controlled oscillator VCO.

The output of the voltage controlled oscillator VCO is then amplified and divided into two by the transistor TR9. One of the two signals thus obtained is fed directly to the second frequency converter FCV2 at the point E. The other signal at the point H is fed to the delay circuit DL, which is the significant feature of the band pass filter circuit of the invention.

The transistor TR10, the capacitor C22 and the resistors R42 to R46 of the delay circuit DL function as a common emitter type amplifier. The helical filter 320 has a signal delay function. The signal at the point H from the voltage controlled oscillator VCO passes through the helical filter 320 and, after receiving the necessary phase shift, is amplified by the transistor amplifier TR10. The signal is then fed to the first frequency converter FCV1 via the point B.

The transistors TR11 to TR14, the resistors R47 to R64 and the capacitors C23 to C30 of the second frequency converter FCV2 function as four sets of common emitter type amplifiers. The transformers T6 and T7, and the diodes D12 to D15 function as a double balanced mixer. The transistor TR15, the resistor R65 and the capacitor C30 function as a common collector type amplifier. The capacitors C31 and C32 and the inductor L4 function as a high pass filter. The output signal from the band pass filter BPF of FIG. 3*a* is fed via the point D, mixed with the output signal from the voltage controlled oscillator VCO at the double balanced mixer D12 to D15, T6 and T7, and is finally subjected to beat-up.

The output of the double balanced mixer is amplified by the transistor amplifier TR13. Unnecessary spurious noises are then cut off at the high pass filter C32, C33, L4. The output of the high pass filter is transferred to the point F via the transistor amplifiers TR14 and TR15.

FIG. 4 shows the normal phase error frequency characteristic, when the delay time $\tau$ of the delay line DL is the parameter. In FIG. 4, the origin is the input carrier frequency $\omega o$. The abscissa represents the frequency variation $\Delta\omega$ and the ordinate represents the phase difference or phase error $\theta$.

In accordance with Equation (5), that is, when $\tau = KK'$, the normal phase difference $\theta$ is reduced to zero. If $\tau > KK'$ or if $\tau < KK'$, the characteristic curves *a* and *b* are varied.

As shown in FIG. 5, if the phase delay element or delay circuit such as, for example, a cable CB, is outside the feedback loop, the delay time $\tau'$ of the cable CB creates a constant phase error. If the phase delay characteristic of the cable CB is that shown in FIG. 6, on the F-I line, and if the phase delay characteristic between the points A to F of FIG. 5 is set as shown by the A-F line, the phase difference characteristic between the points A to I becomes that shown by the line A-I. A constant phase difference, including the phase delay elements outside the feedback loop may this be compensated.

If phases may be varied as a result of a change in the frequency of the delay circuit DL, this suffices as the function of said delay circuit. Thus, for example, as shown in FIG. 7, the filter circuit CC1, CC2, LL1 or a delay line cable may be utilized as the delay circuit or phase control PC. Furthermore, if a delay line DL having a delay time $-\tau$ is utilized, the delay line may be connected between the output of the second frequency converter FCV2 and the voltage controlled oscillator VCO.

As hereinbefore explained, the band pass filter circuit of the invention not only reduces, the constant phase difference due to factors in the feedback loop, but, if necessary, reduces the phase differences due to factors outside the loop to zero, by controlling the phase of the signal supplied from the voltage controlled oscillator VCO to the input of the first frequency converter FCV1. This is accomplished by the phase control circuit PC, which preferably comprises a delay line. This permits a band pass filter circuit to be very effective when highly accurate phase synchronization is required.

While the invention has been described by means of a specific example and in a specific embodiment, we do do not wish to be limited thereto, for obvious modifications will occur to those skilled in the art without departing from the spirit and scope of the invention.

We claim:

1. A band pass filter circuit for a band pass filter having an input and an output, said band pass filter circuit comprising phase detecting means having inputs connected to the input and output of the band pass filter and an output for determining the difference in phase between input and output signals of the band pass filter;

voltage controlled oscillator means having an input coupled to the output of the phase detecting means and outputs having a frequency of oscillation controlled by detection output signals of the phase detecting means;

first frequency converting means having inputs and an output connected to the input of the band pass filter;

input means for supplying input signals to an input of the first frequency converting means;

second frequency converting means having an input connected to the output of the band pass filter, an input connected to an output of the voltage controlled oscillator means and an output for providing an output signal; and phase control means connected between an output of the voltage controlled oscillator means and an input of the first frequency converting means for varying the phase of output signals of the voltage controlled oscillator means and controlling the frequency conversion of the first frequency converting means in accordance therewith.

2. A band pass filter circuit as claimed in claim 1, further comprising low pass filter means connected between the output of the phase detecting means and the input of the voltage controlled oscillator means.

3. A band pass filter circuit as claimed in claim 1, wherein the phase control means comprises a delay circuit.

4. A band pass filter circuit as claimed in claim 1, wherein the phase control means comprises a filter circuit.

5. A band pass filter circuit as claimed in claim 1, wherein the first frequency converting means multiplies input and output signals of the voltage controlled oscillator means and produces an output signal corresponding to the difference therebetween and the second frequency converting means multiplies input signals supplied thereto and output signals of the voltage controlled oscillator means and produces an output signal corresponding to the sum thereof.

* * * * *